United States Patent
Klatt et al.

(10) Patent No.: US 7,533,925 B2
(45) Date of Patent: May 19, 2009

(54) BODY STRUCTURE OF A PASSENGER CAR AND ESPECIALLY OF A CONVERTIBLE

(75) Inventors: Joachim Klatt, Wiernsheim (DE); Gerd Luening, Ditzingen (DE)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 978 days.

(21) Appl. No.: 11/070,667

(22) Filed: Mar. 3, 2005

(65) Prior Publication Data
US 2005/0231002 A1    Oct. 20, 2005

(30) Foreign Application Priority Data
Apr. 17, 2004    (DE) .................. 10 2004 018 745

(51) Int. Cl.
*B60J 5/04*    (2006.01)
*B62D 25/04*    (2006.01)

(52) U.S. Cl. ............ 296/146.6; 296/146.9; 296/187.09; 296/187.11; 296/207

(58) Field of Classification Search .............. 296/146.6, 296/146.9, 187.03, 187.09, 187.1, 187.11, 296/187.12, 193.05, 203.03, 207
See application file for complete search history.

(56) References Cited

U.S. PATENT DOCUMENTS

| | | | |
|---|---|---|---|
| 3,944,278 A | | 3/1976 | Takahashi et al. |
| 4,293,160 A | * | 10/1981 | Lutze et al. ............. 296/187.12 |
| 4,936,621 A | * | 6/1990 | Shimoda et al. ........ 296/187.12 |
| 5,429,410 A | * | 7/1995 | Fleischer ................. 296/146.6 |
| 5,599,057 A | | 2/1997 | Hirahara et al. |
| 5,692,797 A | | 12/1997 | Dancasiu |
| 5,806,917 A | * | 9/1998 | Townsend ................... 296/202 |
| 5,908,216 A | * | 6/1999 | Townsend ................ 296/146.6 |
| 6,053,565 A | * | 4/2000 | Cho ....................... 296/187.12 |
| 6,059,355 A | * | 5/2000 | Friedewald et al. ..... 296/187.09 |
| 6,302,473 B1 | * | 10/2001 | Weber ...................... 296/146.6 |
| 6,382,707 B1 | | 5/2002 | Dunneback |
| 6,517,142 B2 | * | 2/2003 | Gehringhoff et al. ..... 296/146.6 |

(Continued)

FOREIGN PATENT DOCUMENTS

DE    2 411 865 A1    9/1974

(Continued)

OTHER PUBLICATIONS

European Search Report dated May 11, 2007 w/English translation of pertinent portion (four (4) pages).

*Primary Examiner*—D. Glenn Dayoan
*Assistant Examiner*—Greg Blankenship

(57) ABSTRACT

A body structure of a passenger car, and especially of a convertible, features at least one side door on each longitudinal side of the vehicle. The side door, when closed, connects to adjoining fixed pillars via hinges at one end and via a lock assembly at the other end. For improved crash resistance of the body structure of a passenger car, and especially of a convertible, with a rear engine in the event of a head-on collision, a buttress assembly is installed between the rearward rim of the side door and the adjoining lock-side pillar. The buttress assembly effectively holds the side door in its closed position in the event of a head-on collision, while at approximately the level of the buttress assembly, the side door is braced by a hollow strut that extends in the longitudinal direction of the vehicle.

20 Claims, 5 Drawing Sheets

U.S. PATENT DOCUMENTS

| | | | |
|---|---|---|---|
| 6,601,910 B1 * | 8/2003 | Duggan | 296/203.03 |
| 6,663,166 B2 * | 12/2003 | Achleitner | 296/146.6 |
| 7,048,323 B2 * | 5/2006 | Bodin et al. | 296/146.6 |
| 7,070,225 B2 * | 7/2006 | Herrmann | 296/146.6 |

FOREIGN PATENT DOCUMENTS

| | | |
|---|---|---|
| DE | 41 25 301 A1 | 2/1993 |
| DE | 4240 416 A1 | 9/1993 |
| DE | 44 21 095 A1 | 1/1995 |
| DE | 44 25 572 C2 | 12/1995 |
| EP | 1 564 050 A1 | 8/2005 |
| FR | 2.207.039 | 6/1974 |
| JP | 10-147259 A | 6/1998 |
| JP | 2002-29259 A | 1/2002 |
| WO | WO 2004/028842 A1 | 4/2004 |

* cited by examiner

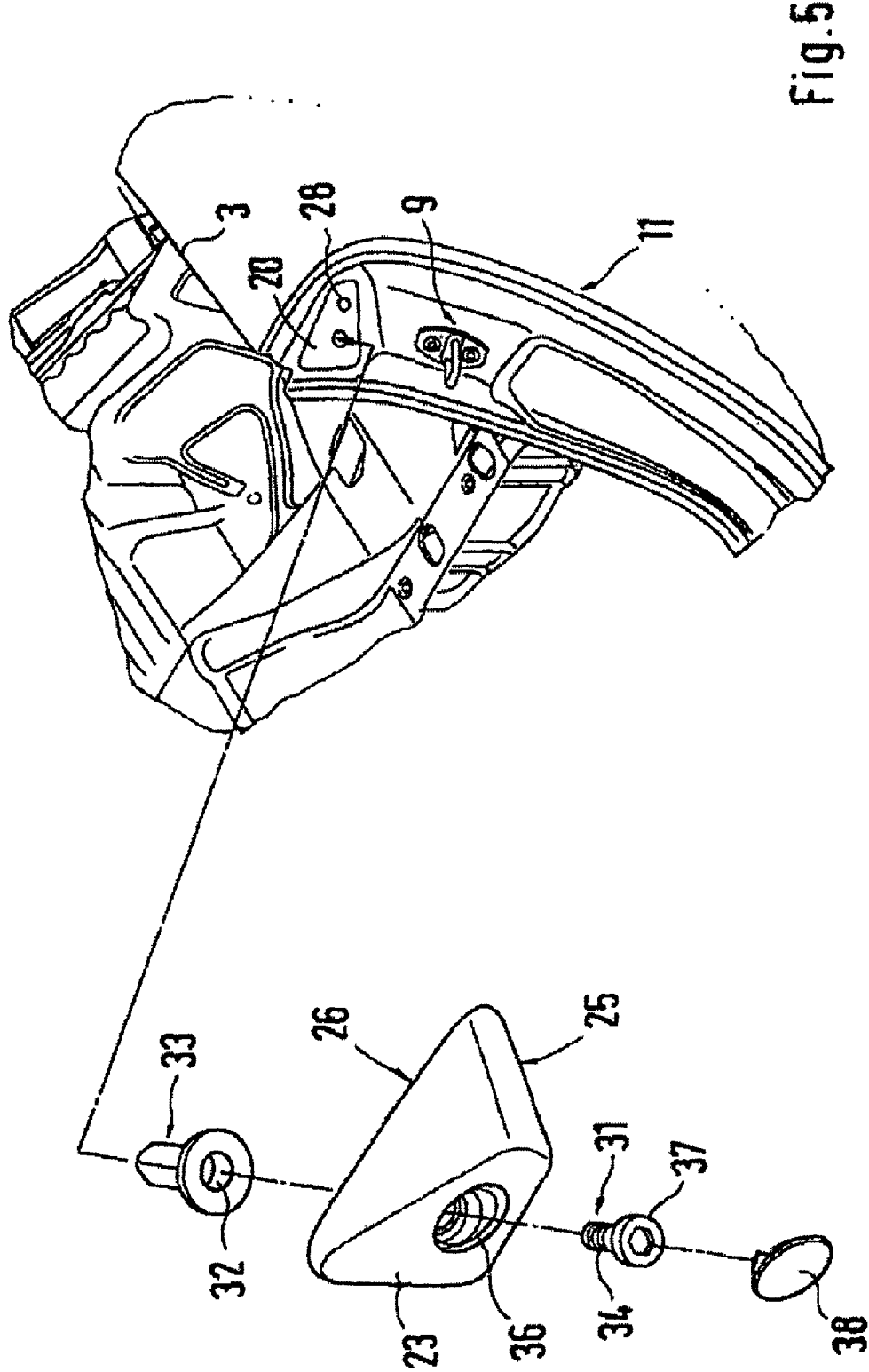

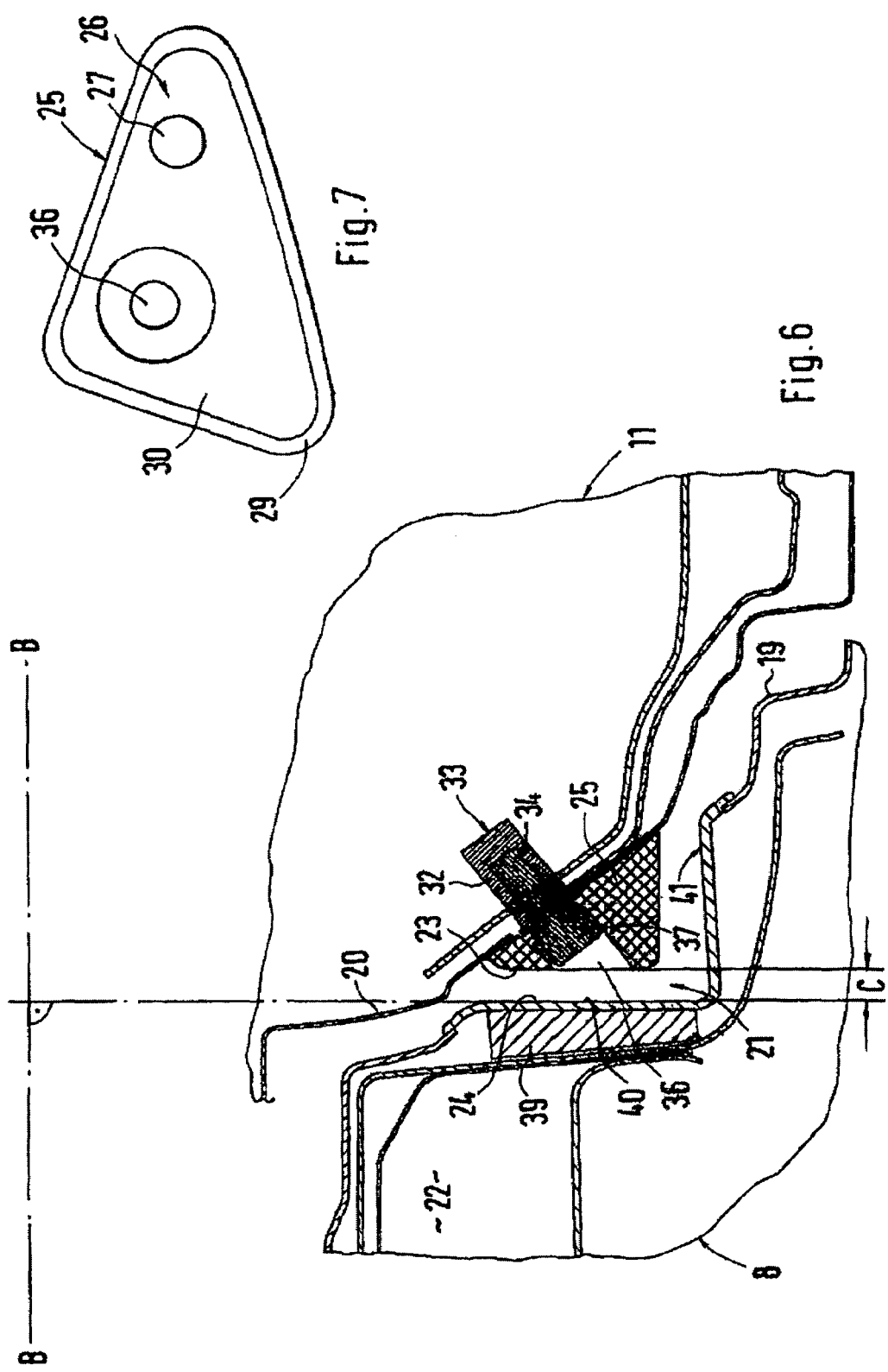

BODY STRUCTURE OF A PASSENGER CAR AND ESPECIALLY OF A CONVERTIBLE

This application claims the priority of German application 10 2004 018 745.2, filed Apr. 17, 2004, the disclosure of which is expressly incorporated by reference herein.

BACKGROUND AND SUMMARY OF THE INVENTION

This invention relates to the body structure of a passenger car and especially of a convertible.

Conventional body structures of passenger cars and especially of convertibles pose a problem in that in the event of a head-on collision, the front and/or rear section of the body shifts in the longitudinal direction of the vehicle, causing the rearward rim of at least one side door to strike the pillar next to the door-lock side.

Due to the die-release camber of the stamped sheet-steel parts constituting the door and the pillar, the side door, when striking the lock-side pillar, tends to bend and slide outward without absorbing any impact energy. Especially in the case of a convertible with a rear engine, the weight of that rear engine causes the aft section of the vehicle to shift forward and the side door to slip out as described above.

It is an object of this invention to introduce provisions in the structural configuration of a passenger car, with emphasis on a convertible equipped with a rear engine, that improve the crash-resistance performance of the body structure in the event of a head-on collision.

According to the invention, this object is achieved with the claimed design features. Additional, advantageous enhancements of the invention are defined by dependent claims.

Primary improvements achieved with the invention include bracing of the side door and interpositioning of a buttress assembly between the rearward rim of the side door or doors and the adjoining pillar. The buttress assembly provides effective support in the case of a head-on collision and significantly improves the crash resistance of the vehicle body, since even in a head-on collision the side door remains in its closed position while also transferring impact energy in the longitudinal direction of the vehicle. In a head-on collision of a convertible with a rear engine, the lock-side pillar will transfer the impact energy through the side door into the hinge-side pillar.

After a head-on collision, the side door can still be opened without difficulty. The effectiveness of the buttress assembly and bracing increases with the height at which the buttress assembly and the bracing are installed (large upward lever arm). Both features are preferably positioned next to the 'equator' of the passenger car, reliably preventing the side door from popping open in the event of a head-on collision.

The buttress assembly is provided on both the side door and the adjoining lock-side pillar, at a right angle to a vertical plane of the longitudinal vehicle center, with butt plates which face each other at a distance and which in the event of a head-on collision impacting the vehicle body come in contact with one another. The butt plate mounted on the fixed pillar preferably is a separate buffer element that can be attached to the pillar. The buffer element is preferably a tetrahedral forged-steel component, mounted on the pillar with the interpositioning of a seal.

The opposite buffer element on the door is composed of a wedge-shaped compensating element and a partial section of a projecting trough-shaped cover plate. The wedge-shaped compensating element is simply attached to the cover plate by means of a double-sided adhesive strip, constituting a prefabricated easy-to-mount component. That component can be installed through an opening provided in the door and can be clipped onto the rim of the opening. It is also possible to integrate the two buffer elements, in unitized fashion, into the door and the fixed pillar, respectively.

The hollow strut connects at one end to the forward hinge reinforcement and at its other end to the lock reinforcement of the door. The hollow strut consists of a tubular element or of a top-hat-contoured partial channel section of the outer door-well reinforcement capped with a hat-shaped edge plate.

BRIEF DESCRIPTION OF THE DRAWINGS

One example of the invention is illustrated in detail in the attached drawings.

FIG. 5 is a perspective, angled front view of the fixed, lock-side body section incorporating the buffer element;

FIG. 6 is an enlarged sectional view along line VI-VI in FIG. 1; and

FIG. 7 shows the bottom surface of the buffer element in the direction of the arrow R in FIG. 5.

DETAILED DESCRIPTION OF THE INVENTION

Figure 1:
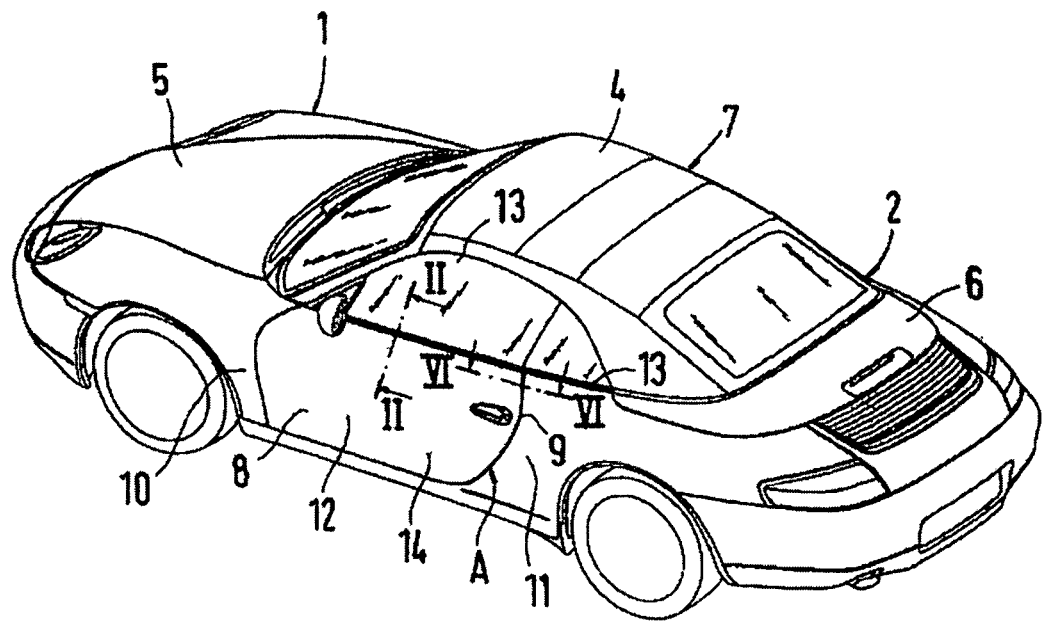
FIG. 1 is a perspective, angled rear view of a passenger car, in this case a convertible.
Figure 2:
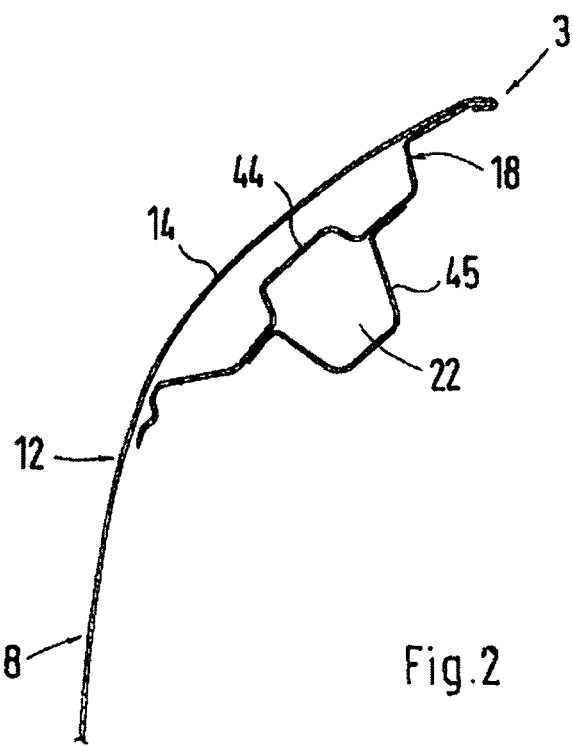
FIG. 2 is a sectional view along the line II-II in FIG. 1, showing only the door shell and a hollow strut connected to the door shell.
Figure 3:
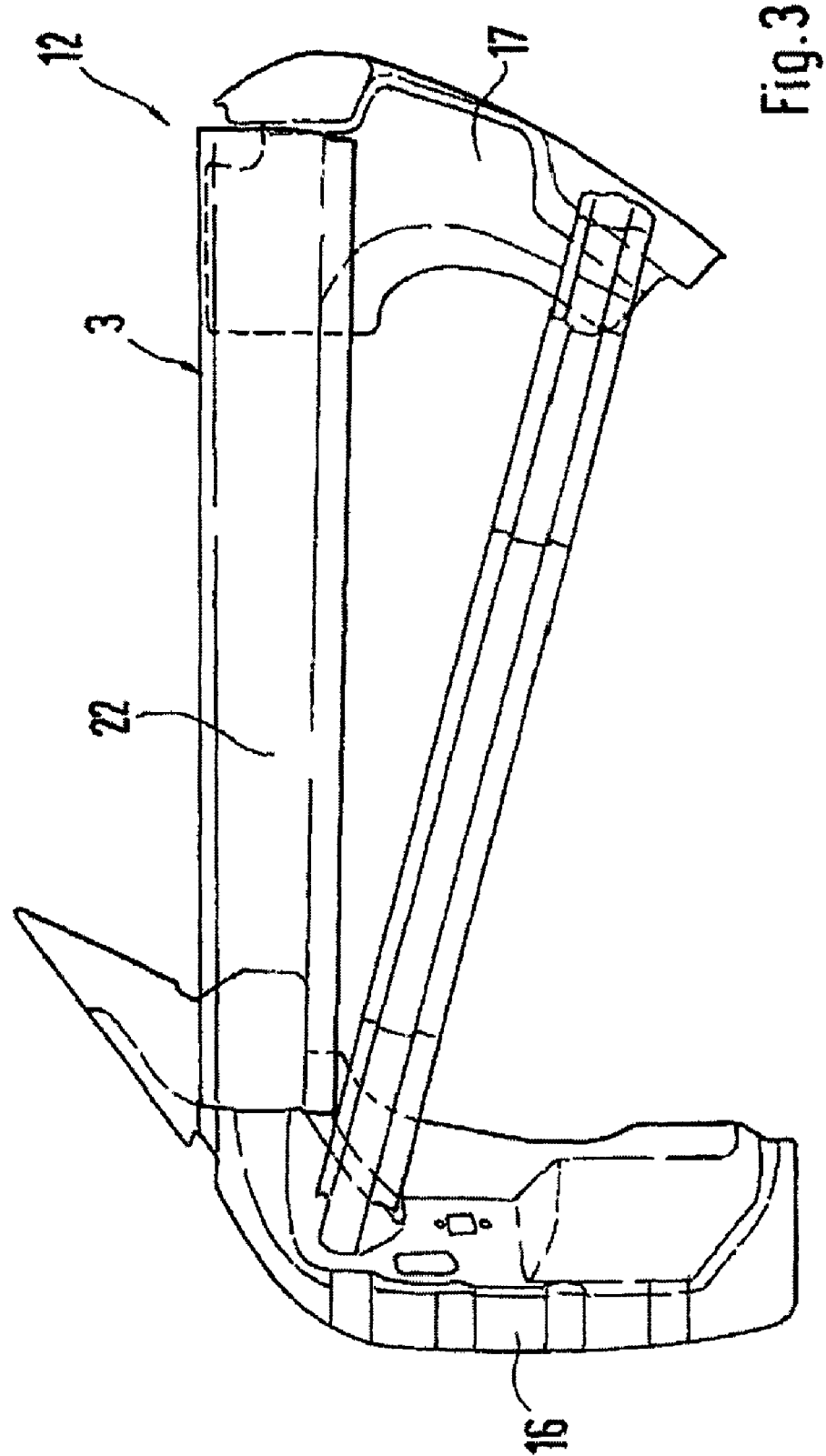
FIG. 3 is an outside view of the support assembly connected to the door shell, depicting the support assembly only.
Figure 4:
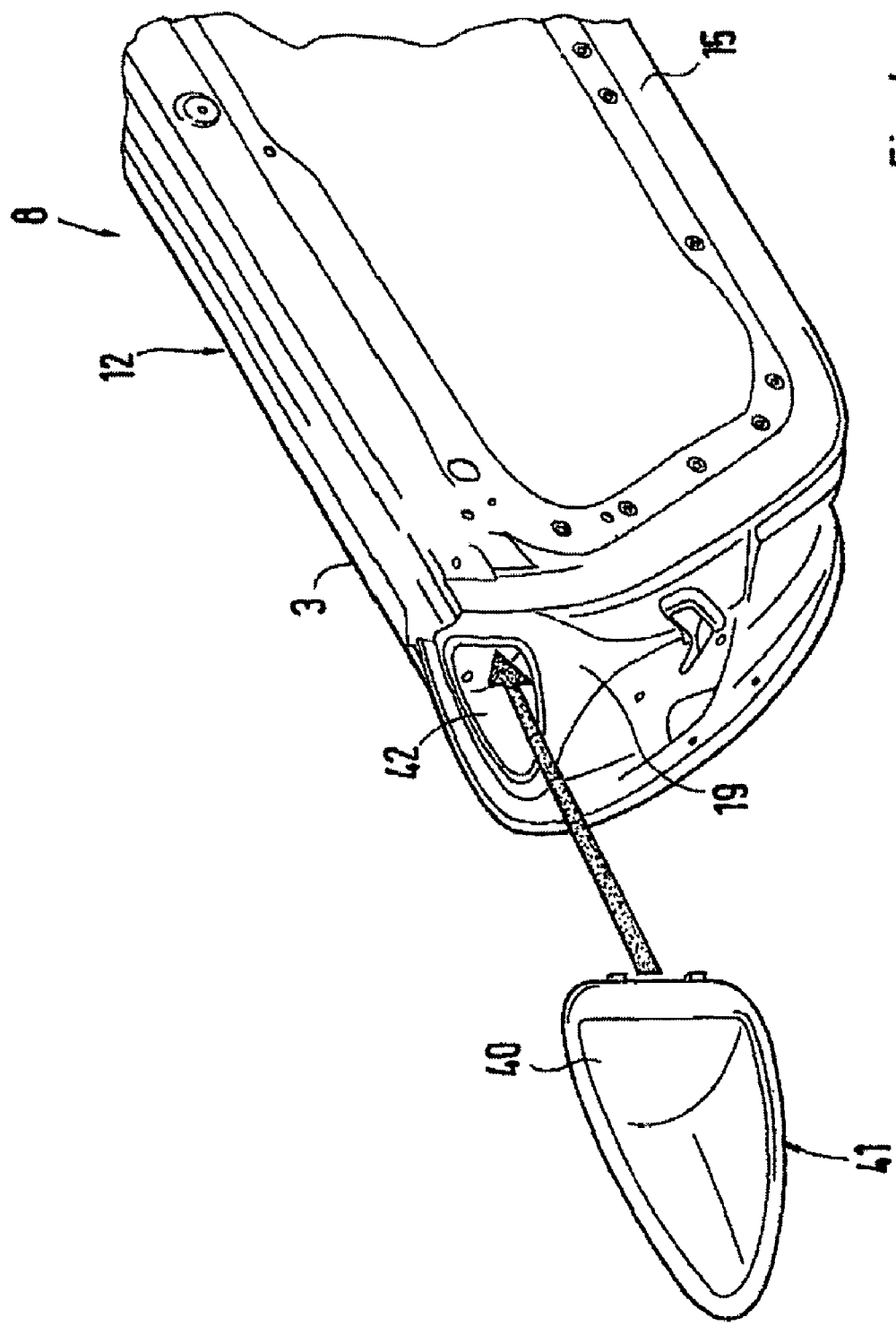
FIG. 4 is a perspective, angled outside view of the lock-side end face of the open door.

FIG. 1 depicts a passenger car 1, i.e. a convertible with a body 2 featuring above its equator 3 a convertible top 4. The body 2 encompasses a front section 5, an aft section 6 containing a rear engine, not illustrated, and, on each longitudinal side of the vehicle next to the passenger seat well 7, at least one side door 8 which, when in its closed position A, connects to adjoining pillars 10, 11 via hinges, not shown, at one end and via a lock system 9 at the other end.

In the example shown, the hinge-side pillar 10 is in the form of an A-pillar and the lock-side pillar 11 is in the form of a center or B-pillar. Each longitudinal side of the vehicle may also be provided with two or more side doors 8.

Each side door 8 includes a door body 12 that extends roughly to the equator 3, and a vertically adjustable door window 13. The door body 12 is composed of an outer shell 14 and an inner door frame 15. Within the door body 12, the hinge area is provided with a hinge reinforcement 16 and the area of the lock system 9 is provided with a lock reinforcement 17.

Next to the equator 3 of the passenger car 1 the door body 12 is provided with an inner door-well reinforcement, not illustrated, as well as an outer door-well reinforcement 18. In the example shown, the side door 8 and the adjoining pillars 10, 11 consist of several interconnected sheet-steel components.

Viewed from the top, the rearward rim 19 of the door 8 and the front face section 20 of the adjoining fixed pillar 11 extend from the inside in front to the outside in back.

Between the rearward rim 19 of the minimum of one side door 8 and the adjoining lock-side pillar 11 a buttress assembly 21, locally effective in the event of a head-on collision, holds the side door 8 in its closed position A. Moreover, the side door 8 is braced, at about the level of the buttress assembly 21, by means of a hollow strut 22 that extends in the longitudinal direction of the vehicle.

The buttress assembly 21 and the hollow strut 22 are positioned as high as possible on the body 2, i.e. preferably close to the equator 3 of the passenger car 1. As shown in FIG. 6, the buttress assembly 21 is provided, both on the side door 8 and on the adjoining pillar 11, with buffer elements 23, 24 that are mounted at a distance from each other and at a right angle to a vertical plane B-B extending in the longitudinal center of the vehicle, and strike each other in the event of a head-on collision that impacts the body 2. In the closed position A of the side door 8 the two buffer elements 23, 24 are spaced apart far enough in the longitudinal direction that the side door 8 can be easily opened (distance C). The buffer element 23 associated with the pillar 11 is mounted on a separate support block 25 that can be attached to the pillar 11.

The support block 25 preferably consists of a forged-steel element which in the implementation example shown is roughly tetrahedral. For the proper alignment of the support block 25 on the pillar 11 the bottom surface 26 of the support block 25 is provided with an alignment pin 27 that engages in a matching hole 28 in the pillar 11. In the bottom surface 26 of the support block 25, next to a continuous peripheral ridge 29, a recess is designed to accommodate a flat gasket 30.

The gasket 30 is glued into the recess. The support block 25 is preferably attached to the pillar 11 by means of a detachable screw connection 31. To that effect the fixed pillar 11 is provided with a socket element 33 featuring a female thread 32 that accepts a mounting screw 34 for locking the support block 25 in place. In the support block 25 a stepped cylindrical bore 36 accepts the mounting screw 34. The cylindrical bore 36 essentially extends at a right angle to the bottom surface 26. The head 37 of the mounting screw 34 is concealed by a cap 38 that snaps into the bore 36.

In the example shown, the door-side buffer element 24 is composed of a wedge-shaped compensating element 39 and a partial section 40 of a projecting trough-shaped cover plate 41. The wedge-shaped compensating element 39 is a cast-metal component, pre-mounted on the trough-shaped cover plate 41 by means of a double-sided adhesive strip. Both components are installed in the door 8 through an opening 42 provided in the rearward end face of the door 8. The rim of the cover plate 41 is attached to the opening 42 by means of clip-on connectors. When installed, another double-sided adhesive strip is positioned between the surface of the compensating element facing away from the cover plate 41 and the front end of the hollow strut 22. In cases where the side door 8 and/or the adjoining lock-side pillar 11 are cast-metal components, at least one of the two buffer elements 23, 24 could conceivably be integrated in unitized fashion into the door 8 or the pillar 11.

One end of the hollow strut 22 connects to the forward hinge reinforcement 16, its other end to the lock reinforcement 17 of the door frame 15, thus forming a frame-like composite structure. In the example shown, the hollow strut 22 is made up of a partial, hat-shaped channel section 44 of the outer door-well reinforcement 18 topped by a hat-shaped edge plate 45, with the door-well reinforcement 18 and the edge plate 45 firmly connected on parallel flanges by a welding, cementing or similar process.

The hollow strut 22 could alternatively be in the form of an essentially horizontally aligned tube (not shown) extending in the longitudinal direction of the vehicle and being so dimensioned that in the longitudinal direction of the vehicle it can transfer strong forces without buckling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A body structure of a passenger car with a side door on each side of the vehicle, the side door, when closed, connecting to adjoining pillars via hinges at one end and via a door-lock assembly at its other end, the body structure comprising:
    a buttress assembly provided between the rearward rim of the side door and the adjoining lock-side pillar for effective support by holding the side door in its closed position in the event of a head-on collision, and
    a hollow strut extending in the longitudinal direction of the vehicle by which the side door is braced at about the level of said buttress assembly.

2. The body structure as claimed in claim 1, wherein the buttress assembly and the hollow strut are positioned as high as possible.

3. The body structure as claimed in claim 1, wherein, on both the side door and the adjoining lock-side pillar, the buttress assembly is provided with buffer elements that extend at a distance from each other, at a right angle to a vertical plane in the longitudinal center of the vehicle, and come in contact with each other in the event of a head-on collision impacting the vehicle body.

4. The body structure as claimed in claim 3, wherein one of the buffer elements which is associated with the lock-side pillar is provided on a separate support block that can be attached to the lock-side pillar.

5. The body structure as claimed in claim 4, wherein the support block is a forged-steel component.

6. The body structure as claimed in claim 4, wherein the support block has a tetrahedral contour.

7. The body structure as claimed in claim 4, wherein, on a bottom surface of the support block, a projecting alignment pin engages in a matching hole on the lock-side pillar.

8. The body structure as claimed in claim 4, wherein a recessed section in the bottom surface of the support block is designed to accommodate a flat gasket.

9. The body structure as claimed in claim 4, wherein a socket element on the lock-side pillar features a female thread that accepts a mounting screw serving to hold the support block in position.

10. The body structure as claimed in claim 9, wherein the support block is provided with a cylindrical bore for accepting the mounting screw, and wherein a head of the mounting screw is concealed by a snap-on cap.

11. The body structure as claimed in claim 3, wherein one of the buffer elements is a door-side buffer element composed of a wedge-shaped compensating element and a partial section of a projecting trough-shaped cover plate.

12. The body structure as claimed in claim 11, wherein the wedge-shaped compensating element is a cast-metal part that is attached to an inside of the cover plate by a double-sided adhesive strip and constitutes a pre-installed component.

13. The body structure as claimed in claim 12, wherein said component is pre-installed through an opening in an end face of the door, and wherein the cover plate is locally attached to a rim of the opening by clip-on connectors.

14. The body structure as claimed in claim 3, wherein at least one of the buffer elements is integrated in unitized fashion into the side door or into the adjoining pillar.

15. The body structure as claimed in claim 1, wherein the hollow strut connects at one end to a forward hinge reinforcement and at its other end to a lock reinforcement of the door.

16. The body structure as claimed in claim 1, wherein the hollow strut is a tubular element.

17. The body structure as claimed in claim 1, wherein the hollow strut is composed of a partial, hat-shaped channel section of an outer door-well reinforcement capped by a hat-shaped edge plate, and wherein said door-well reinforcement and said edge plate are firmly connected on parallel flanges by welding, cementing, or a similar process.

18. The body structure as claimed in claim 1, wherein said passenger car is a convertible.

19. The body structure as claimed in claim 2, wherein the hollow strut is positioned next to an equator of the passenger car.

20. The body structure as claimed in claim 2, wherein, on both the side door and the adjoining lock-side pillar, the buttress assembly is provided with buffer elements that extend at a distance from each other, at a right angle to a vertical plane in the longitudinal center of the vehicle, and come in contact with each other in the event of a head-on collision impacting the vehicle body.

* * * * *